United States Patent
Römer et al.

(10) Patent No.: US 10,496,517 B2
(45) Date of Patent: Dec. 3, 2019

(54) SYSTEM AND METHOD FOR PROVIDING RUNTIME DIAGNOSTICS OF EXECUTING APPLICATIONS

(71) Applicant: ZeroTurnaround AS, Tartu (EE)

(72) Inventors: Toomas Römer, Tartu (EE); Jevgeni Kabanov, Tallinn (EE); Anton Arhipov, Tallinn (EE)

(73) Assignee: Zeroturnaround AS, Tartu (EE)

( * ) Notice: Subject to any disclaimer, the term of this patent is extended or adjusted under 35 U.S.C. 154(b) by 357 days.

(21) Appl. No.: 14/613,004

(22) Filed: Feb. 3, 2015

(65) Prior Publication Data

US 2015/0220421 A1  Aug. 6, 2015

Related U.S. Application Data

(60) Provisional application No. 61/935,367, filed on Feb. 4, 2014.

(51) Int. Cl.
*H04L 29/06* (2006.01)
*G06N 99/00* (2019.01)
(Continued)

(52) U.S. Cl.
CPC ........ *G06F 11/3612* (2013.01); *G06F 11/321* (2013.01)

(58) Field of Classification Search
CPC ............. G06F 11/3688; G06F 11/3664; G06F 11/3636; G06F 11/3466; G06F 8/443;
(Continued)

(56) References Cited

U.S. PATENT DOCUMENTS

| 8,006,140 B2 * | 8/2011 | Khanna ............... G06F 11/0709 714/45 |
| 8,146,057 B1 | 3/2012 | Michelsen |

(Continued)

OTHER PUBLICATIONS

Ning et al., A failure diagnosis based topology reconfiguration scheme for ad hoc networks, 6 pages (Year: 2010).*
(Continued)

*Primary Examiner* — Thuy Dao
(74) *Attorney, Agent, or Firm* — Fredrikson & Byron, P.A.

(57) ABSTRACT

A system and method that provides runtime diagnostics information of server applications executing on application servers of a server system. At class load time, the system injects executable software code that creates and displays the diagnostics information without necessarily having to stop and restart the executing server application. In response to user applications on user devices sending request messages for content from the server application, the system injects executable code into the application server that collects the diagnostics information, produces display components, and includes the diagnostics information within the display components. The server application then includes the display components and the requested content in response messages sent to the user devices. Preferably, the diagnostics information is presented in the same display context on the user device as the requested content, such as pages within a web browser. In examples, the diagnostics information includes enhanced call stack trace and memory profilers.

29 Claims, 10 Drawing Sheets

(51) Int. Cl.
*G06F 3/0484* (2013.01)
*H04L 12/24* (2006.01)
*G06F 3/0482* (2013.01)
*G06F 11/36* (2006.01)
*G06F 11/32* (2006.01)

(58) Field of Classification Search
CPC .... G06F 8/441; G06F 16/951; G06F 16/9535; G06F 16/955; G06F 16/958; G06F 2221/2119; G06F 2221/2145; G06F 11/3612; G06F 11/321; G06Q 30/02; G06Q 10/10; G06Q 10/06; G06Q 10/101; H04L 63/0428; H04L 63/08; H04L 63/123; H04L 67/02; H04L 67/1097; H04L 63/1408; H04L 63/166; H04L 67/12; G07F 17/32; G07F 17/3223; G07F 17/323; G07F 17/3232; G07F 17/326
See application file for complete search history.

(56) References Cited

U.S. PATENT DOCUMENTS

| | | | | |
|---|---|---|---|---|
| 8,180,845 | B2* | 5/2012 | Brendle | H04L 29/06 709/203 |
| 8,397,227 | B2* | 3/2013 | Fan | G06F 9/445 717/158 |
| 8,418,179 | B2* | 4/2013 | Papakipos | G06F 9/5027 717/140 |
| 8,458,670 | B2* | 6/2013 | Day | G06F 9/445 717/130 |
| 8,555,259 | B2* | 10/2013 | Krauss | G06F 11/3466 717/133 |
| 8,572,160 | B2* | 10/2013 | Mackey | H04L 29/06047 709/203 |
| 8,849,985 | B1* | 9/2014 | Colton | G06F 9/45529 709/203 |
| 9,075,892 | B2* | 7/2015 | Lin | G06F 17/30893 |
| 9,148,293 | B2* | 9/2015 | McFate | G06F 9/5027 |
| 9,195,511 | B2* | 11/2015 | Tung | G06F 9/5072 |
| 9,306,915 | B2* | 4/2016 | Atamna | H04L 67/06 |
| 9,450,999 | B2* | 9/2016 | Werr | H04L 67/06 |
| 9,990,402 | B2* | 6/2018 | Srinivasan | G06F 16/24568 |
| 2002/0184363 | A1* | 12/2002 | Viavant | H04L 29/06 709/224 |
| 2004/0068560 | A1* | 4/2004 | Oulu | G06F 11/3495 709/224 |
| 2005/0138113 | A1* | 6/2005 | Brendle | H04L 29/06 709/203 |
| 2006/0218533 | A1* | 9/2006 | Koduru | G06F 11/3447 717/124 |
| 2007/0011330 | A1* | 1/2007 | Dinker | G06F 11/3409 709/226 |
| 2008/0184129 | A1* | 7/2008 | Cancel | G06Q 30/02 715/741 |
| 2008/0195752 | A1 | 8/2008 | Singla et al. | |
| 2009/0089749 | A1* | 4/2009 | Day | G06F 9/445 717/118 |
| 2009/0144714 | A1* | 6/2009 | Fan | G06F 9/445 717/166 |
| 2009/0271735 | A1* | 10/2009 | Anderson | G06F 9/451 715/815 |
| 2009/0271771 | A1* | 10/2009 | Fallows | G06F 9/45516 717/137 |
| 2010/0017791 | A1 | 1/2010 | Finkler | |
| 2010/0058353 | A1* | 3/2010 | Turski | G06F 9/54 719/311 |
| 2010/0287418 | A1* | 11/2010 | Khanna | G06F 11/0709 714/45 |
| 2010/0287541 | A1* | 11/2010 | Saunders | G06Q 30/06 717/139 |
| 2011/0145399 | A1* | 6/2011 | Jeyapaul | G06F 21/604 709/224 |
| 2011/0252138 | A1* | 10/2011 | Ahuja | G06F 17/3089 709/226 |
| 2012/0151375 | A1* | 6/2012 | Lin | G06F 17/30893 715/741 |
| 2012/0317796 | A1* | 12/2012 | Blanc | H01M 10/0404 29/623.2 |
| 2013/0086424 | A1 | 4/2013 | Smiljanic et al. | |
| 2014/0109070 | A1* | 4/2014 | Mahamuni | G06F 8/75 717/157 |
| 2014/0215443 | A1* | 7/2014 | Voccio | G06F 11/3612 717/128 |
| 2014/0237454 | A1* | 8/2014 | Delporte | G06F 11/3636 717/128 |
| 2014/0282430 | A1* | 9/2014 | Kew | G06F 11/34 717/130 |
| 2015/0143180 | A1* | 5/2015 | Dawson | G06F 11/3636 714/38.1 |
| 2015/0143344 | A1* | 5/2015 | Davis | G06F 8/751 717/129 |
| 2015/0178251 | A1* | 6/2015 | Guggisberg | H04L 67/42 715/234 |
| 2016/0147992 | A1* | 5/2016 | Zhao | H04L 63/102 726/22 |
| 2016/0232017 | A1* | 8/2016 | Raundahl Gregersen | G06F 9/44521 |

OTHER PUBLICATIONS

Arulraj et al., Production-run software failure diagnosis via hardware performance counters, 12 pages (Year: 2013).*

International Report on Patentability, dated Aug. 18, 2016 from International Application No. PCT/IB2015/050828, filed on Feb. 3, 2015. Seven pages.

International Search Report and Written Opinion of the International Searching Authority, from counterpart International Application No. PCT/IB2015/050828, filed on Feb. 3, 2015.

* cited by examiner

SYSTEM AND METHOD FOR PROVIDING RUNTIME DIAGNOSTICS OF EXECUTING APPLICATIONS

RELATED APPLICATIONS

This application claims the benefit under 35 USC 119(e) of U.S. Provisional Application No. 61/935,367, filed on Feb. 4, 2014, which is incorporated herein by reference in its entirety.

BACKGROUND OF THE INVENTION

An application server, also called an app server, is a software program that runs on computer devices known as server systems. Server systems are typically high-availability, high-performance computer systems that include an organization's backend business logic and store information within databases. Application servers host and expose an organization's backend business logic and processes via various Application Programming Interfaces (APIs) and protocols, possibly including HTTP. Separate instances of an application server can be created on a server system to provide client-specific content.

Application servers typically host complex, transaction-based server applications that run on top of the application servers. One example of a server application is a web application. The server applications are typically designed to be accessed by many simultaneous users. The server applications can access the business logic and private data on the server system via the application server's APIs and protocols. In one example, these server applications are web applications.

User device applications running on user devices request content from the server applications. The server applications deliver the requested content, such as web page content, over a network connection such as the Internet to the user device applications. User devices include mobile phones, tablets, other mobile computing devices, and desktop computers, in examples. All request messages and response messages between the user device applications and the server applications typically occur through an application server.

The architecture of server applications can vary, but common to all server applications, they are designed around the ability to serve multiple users on user devices through a web browser or other interface or user device application. In one example, web browsers send HTTP request messages to the application server for page content from the server applications. The application server, in turn, sends the request for the page content to the server application. The server application then sends the page content to the application server, which the application server includes in an HTTP response messages to the web browser. The web browser or other user device application then renders the page content within a page such as an HTML page.

In order to provide a per user scope for each individual user, server applications such as web applications provide the capability of handling separate sessions for each user. A session is a semi-permanent interactive information interchange, also known as a dialogue, conversation, or meeting, between two or more communicating devices or between a computer and a user. A session is set up or established at a certain point in time and torn down at a later point in time. An established communication session may involve more than one message in each direction. A session is typically, but not always, stateful, meaning that at least one of the communicating parts needs to save information about the session history in order to be able to communicate with another entity. In contrast, stateless session communications involve independent requests and responses.

Session data refers to the in-memory, per-user state associated with sessions. Session data of a web application that communicates with a web browser via an application server is typically stored on the application server. The size of session data is important for scalability as the total session data size is proportional with the number of users concurrently engaged in a session.

A platform or framework is a combination of hardware architecture and/or software that enables software to run on different devices. Software platforms are typically a combination of software libraries and other executables that present well-defined Application Programming Interfaces ("API"). Software developers are increasingly utilizing modern software platforms to enable the creation of platform-independent server applications.

Modern software platforms typically include a programming language, the compiled output of which executes within the context of machine-dependent programs, known as virtual machines ("VM"). VMs permit an isolated processing environment to exist on a computer system. VMs are typically installed directly on top of an operating system of the computer system, such as a server system. VMs hide or abstract the details of the underlying computer system from the software that executes within each VM. To create platform-independent server applications, software developers use platform tools to compile the programming language source code of the server applications into the software executable that runs on the VMs, also known as bytecode.

Java and NetBeans are registered trademarks of Oracle Corporation. Oracle associates the Java trademark with its eponymous computer programming language, Java, the Java Virtual Machine ("JVM,") and related infrastructure and tools. Oracle associates the NetBeans trademark with its eponymous development platform, NetBeans IDE, and related tools such as NetBeans Profiler. .NET is a registered trademark of Microsoft Corporation. For .NET, Microsoft provides its C# programming language, .NET runtime virtual machine, and related infrastructure and tools.

An example of an application server is a Java application server such as IBM WebSphere, Apache Tomcat, JBoss, Eclipse Jetty, and Glassfish. IBM and WebSphere are registered trademarks of IBM, Inc. JBoss is a registered trademark of RedHat, Inc. Glassfish is a registered trademarks of Oracle, Inc. These Java application servers implement various level of support for the Java 2 Enterprise Edition application server, or J2EE. In these examples, the web applications are Java web applications that run on top of the Java application servers. The Java application servers, in turn, run on top of Java virtual machines.

Another example of an application server is a .NET platform application server that hosts C#-based web applications.

Bytecode is one example of executable code. Bytecode is typically a set of binary files that include platform-neutral instructions for implementing application behavior. The VMs interpret the bytecodes, and execute corresponding native instructions on the target computer system associated with the bytecodes. Examples of software platforms that enable the creation of computer system-independent applications include the Java and .NET platforms.

Server applications are built using program code implemented in a programming language, such as Java. The program code is structured into classes. Classes are further structured into methods. Instances of a class are called objects. Objects include executable versions of the program code. A call hierarchy is a listing that displays all calls to and from a selected method, field or constructor. The call hierarchy enables developers to better understand how the code flows and to evaluate the effects of changes to the code. A call hierarchy is typically in a tree format.

A stack trace is a listing of all objects and their methods invoked during a running server application. Stack traces provide a chain or ordered list of methods. In the stack trace, a developer can follow the specific call hierarchy of each method.

In an error condition, the last called method in a stack trace is the method where the erroneous condition occurred during the runtime operation of the application, such as an exception being thrown. This gives a developer some insight about what the software was attempting to do when the potential problem arose.

A memory snapshot is the image of the in-memory data such as session data for a server application at a certain point in time. Often it is captured automatically when the underlying server application is running out of memory. Specialized memory analyzer tools such as memory profilers have been developed for debugging purposes. Memory profilers allow memory snapshots to be taken on-demand.

Using memory profilers, developers typically look for differences in memory snapshots of an application such as a server application taken at different times in an effort to look for memory leaks in the application. Memory leaks occur when one or more objects allocate memory resources to perform tasks but fail to release the memory resources when the objects have completed those tasks or when the objects are deleted. Each memory snapshot typically includes memory usage information of all objects in the session.

Current state of the art memory analysis tools provide capabilities to take memory snapshots on-demand and to inspect the state of the application at the time the snapshot was taken. One such state-of-the-art memory tool is the Eclipse Memory Analyzer Tool (MAT). Once a snapshot is taken by MAT, developers can inspect the dataset and attempt locating the relevant session data. When developers suspect that a certain use-case takes up too much session data, they must take two different snapshots manually, one before the suspicious use case, and one after.

Analyzing differences between two independent memory snapshots of a session provides information for memory utilization of objects in the session over time. This can be especially useful in finding memory leaks. However, this is a cumbersome and highly time-consuming task that does not provide a guarantee of showing what actually caused memory resource utilization in the session data to grow unexpectedly. A common reason that current memory analysis tools fail to discover memory leaks is that they often cannot reproduce the use case(s) of specific data values that cause the memory leaks.

The memory profiler built into the NetBeans IDE does provide some improvements over MAT. This is because unlike MAT, the NetBeans IDE calculates the diff of two snapshots. However, developers still need to trigger the action taking the memory snapshots when required. Unlike MAT, developers using the NetBeans IDE do not need to manually inspect two different snapshots, since the NetBeans memory profiler provides the diff view.

However, the manual memory snapshots obtained using MAT and the diff view snapshots provided by the NetBeans IDE will still contain all objects on the entire heap, including data structures of many well-known but otherwise irrelevant collections and packages. This creates clutter and adds to search overhead. As a result, the relevant session data that can provide insight into causes of memory leaks can be very difficult to locate in memory snapshots provided by these and other current memory profiler tools.

Developers can sometimes find the causes of a memory leak by analyzing the memory and stack traces of a server application's session data at appropriate times. Many problems, however, require the user to reproduce the memory leaks in order to find their cause. For example, if a developer of a program discovers (e.g. by means of memory analyzer tool, logging statements etc.) an unusual increase in memory consumption that causes a crash of the programs, it is already too late to take new memory snapshots for further analysis. The developer must restart the program, reproduce the issue, and take the memory snapshots at the correct times.

SQL and NoSQL queries are exemplary types of database query language requests. An SQL query is made from a server application's program code to an SQL-based database that stores the server application's data. For typical information systems providing various custom data in web browsers, loading and displaying just one page of data (that includes some changes to the data) requires numerous queries against the database.

SUMMARY OF THE INVENTION

Software tools such as source code level debuggers, call stack traces, and memory profilers provide information about suspicious events occurring within the server applications or application servers. The information provided by these tools is also known as diagnostics information. Application developers use diagnostics information to improve and validate applications and for detecting, analyzing, and correcting errors or bugs within the server applications or application servers.

However, current approaches for detecting, analyzing, and correcting errors or bugs within an executing server application have limitations. Specifically, current approaches cannot provide automatic and immediate actionable diagnostics information while the server applications are still running/executing. Instead, developers must use general-purpose debugging or diagnostics software that lacks the ability to provide relevant diagnostics information, thus they have to search through endless of data in order to find the defects.

Moreover, current methods do not provide the ability to display the diagnostics information of the server applications within the same display context as the running server applications. While a server application typically displays its page content in one display context, such as a web browser on a user device, the diagnostics information is typically displayed in a separate display context, such as a new/separate 'debug' native graphical window opened on the user device. Thus, developers are typically required to avert their gaze from the web browser to the separate window of the analysis tool that includes the gathered and analyzed diagnostics information in order to diagnose problems with the executing server application.

In general, according to one aspect, the invention features a method for providing diagnostics information of a server application executing on an application server. The method includes injecting executable code including event triggers and action routines into the application server, the application server receiving request messages for content from an application on a user device, and the event triggers executing the action routines in response to events that meet defined conditions of the event triggers. The method also includes the action routines collecting the diagnostics information, and the action routines including the diagnostics information with the requested content within response messages sent by the application server to the user device application.

Preferably, the action routines produce display components, including the diagnostics information within the display components, and including the display components and the requested content within the response messages sent by the application server to the user device application. The user device applications then render the diagnostics information with the requested content within a display context of the user device application. Typically, the user device applications are web browsers, but can also be native applications.

The response action routine typically executes some of the worker action routines, where the worker action routines produce display components, include the diagnostics information within the display components, and include the display components within the response messages sent to the user device application.

The present invention can be used to augment the behavior of application servers during class loading of the application servers. Specifically, the invention injects executable code into core classes located within the application server when specific classes are loaded for the application server. The injected executable code includes code statements of action routines and event triggers that gather and prepare diagnostics information for the server applications that run on top of the application server.

The event triggers include a request event trigger, one or more worker event triggers, and a response event trigger. The action routines include a request action routine, one or more worker action routines, and a response action routine.

Preferably, the request event trigger executes the request action routine in response to the application server receiving the request messages from the user device application. The request action routine enables the worker event triggers. The worker event triggers execute the worker action routines in response to events that meet defined conditions of the worker event triggers, and the worker action routines collect the diagnostics information.

The response event trigger executes the response action routine in response to the application server preparing to send the response messages to the user device application.

In general, according to another aspect, the invention features a system for providing diagnostics information of an executing server application. The system includes user devices including applications that send request messages to request content, and an application server.

The application server hosts the server application, receives the request messages for content from the user device applications, and includes a controller module. Preferably, the controller module injects executable code into the application server, and the injected executable code includes event triggers and action routines. The event triggers execute the action routines in response to events that meet defined conditions of the event triggers, and the action routines collect the diagnostics information. The action routines then include the diagnostics information with the requested content within response messages sent by the application server to the user device application.

The code locations of the application server that include the injected code will be accessed by the server applications. In an exemplary implementation, class loading hooks obtained by a controller module Java Agent injects bytecode that adds to the original bytecode of selected (and precompiled) classes of an executing server application. The additional bytecode is then loaded by a class loader into the JVM. This provides the ability to add enhanced diagnostics and reporting capabilities to a running server application without the need to restart the server application.

The injected executable code can also produce display components that in turn include the diagnostics information. The display components are preferably included within response messages sent by the application server to the user device application.

The injected executable code preferably includes code for event triggers and action routines. The execution of some of the action routines can also produce display components. Examples of display components include Graphical User Interface (GUI) windows and toolbars.

Event triggers include code associated with events that can occur in a server application or in the application server. The event triggers "fire," or execute, in response to events that occur that meet the conditions defined in the event triggers. Such events include but are not limited to the execution of specific programming executables, namely the code of method bodies within the Java programming language or the .NET programming model, and changes in state of objects and variables, in examples. Warning triggers include code associated with the generation of warning messages based on the automatic analysis of the code executed by action routines.

The event triggers and the warning triggers "fire," or execute in response to the occurrence of events that meet defined conditions of the event triggers and warning messages. The warning triggers typically generate warning messages and warning icons, and include the warnings messages and warning icons in a warning component. The event triggers typically execute action routines that execute specific tasks or actions upon the running server application.

The action routines can be utilized to execute code statements that produce the display components. In examples, the display components enable server application developers to manage and display the event triggers and warning triggers. This solution is independent of the particular server (web) application framework or technology and is able to work together with any server (web) application, such as applications sending HTML or similar responses to a web browser or other application running on a user device. The executing third party server (web) application itself is not required to be aware about the injected executable code components.

Unlike current solutions, however, the GUI window display components do not need to integrate with the executing server applications at the code level. Moreover, the GUI window and its included diagnostics information are presented within the same web page as the executing user device application.

In the case of Java-based server applications, a custom GUI display component such as a pop-up menu or toolbar can be produced and then presented in the web browser or other application of a client user device for any executing Java-based server application, including those of third parties, without having to modify the program code of the Java-based server application. Preferably, the GUI display components produced by the action routines are custom HTML/JavaScript components. The server applications are third party Java-based server applications that run on top of a Java application server. This system can used to render the display components within the Java application server without modifying the code of the server application itself. The method typically intercepts the serving of an HTTP request message within the Java application server such as a J2EE server after the HTTP response has been generated by the Java server application. The method then modifies the generated response by injecting code into the response HTML/JavaScript. The injected code displays the custom component in the user's web browser.

In another example, the invention can provide contemporaneous feedback about memory consumption of session data of a running server application as the diagnostics information. To provide feedback about memory consumption of the server application, the diagnostics information includes two or more memory snapshots of the server application's session data. In contrast, memory snapshots of current memory profilers typically provide a single object size value for the high-level objects referenced during a run-time session. The object size value is the aggregate of the sizes of all data fields and sub-objects of each object.

The memory snapshots diagnostics information can provide a more focused and comprehensive breakdown of object size information associated with each object referenced during a run-time session. For example, the memory snapshots of the present invention can include object size information for every object, child object of each object, and attribute of each object that is reachable from the session root object. A child object of an object is also known as a sub object of that object. This provides a much more focused view of the specific memory consumption of a server application for developers during memory leak investigations than current approaches.

Another benefit of the run-time injection of executable code as applied to memory profiling is the ability to provide diagnostics information to the developer in response to the server application or application server satisfying defined threshold values. Examples of defined threshold values include the percentage of total growth in session data size for two consecutive snapshots and the absolute growth in size. When the injected code determines that a threshold value has been reached, it provides the ability to warn developers by pushing a warning message to the visible interface of the developer testing the system.

Preferably, the visual interface for presenting the warning message can be a third party GUI component that is injected at the same time as and is interoperable with the injected executable code that implements the triggering of the thresholds and their associated action routines. Developers can react, if they choose to, upon the warnings and then immediately inspect the relevant session data and the exact changes in session data memory since the last snapshot without having to reproduce the issue leading to the suspicions situation.

In addition, because the injected executable code is included within the same code locations as the application server, the injected executable code can filter from the memory snapshots all object information in the heap space outside the memory space of the session data. As a result, the scope of the presented data is narrowed to the memory space of the session data, which makes debugging of memory leaks more efficient and saves time.

In yet another example, in Java applications, the executable code injection can enhance or repurpose the normal Java call hierarchy view to additionally show which Java methods make database query language requests, such as SQL queries, as the diagnostics information. From the entire tree of method calls, only those methods that make SQL queries are selected. The rest of the tree is discarded. The remaining tree is then enhanced with information about the SQL queries that each of the methods invoke.

Preferably, the data of all the SQL queries are collected by patching the Java SQL driver on the web application server in a way that registers all the executed queries and stores enough data about them so that these types of views can later be rendered. If there are similar queries, then the SQL queries made by one method are also organized hierarchically. In another example, SQL queries that are the same by their structure but differ from each other by their parameter values are grouped together.

In still another example, the executable code injection can enhance state information for objects within a Java call stack trace as the diagnostics information. The stack trace is enhanced with information about the data that the methods in the stack trace were processing before the exception occurred. The injected executable code saves the data values of variables and objects associated with the state of the application at each point in the stack trace. This information is saved within the context of each stack frame/method.

In the event that execution of the web application leads to an exception, the system can present the enhanced stack trace information in the same context as the server application at the time of the exception via a GUI display component.

In contrast, while current stack trace methods identify the exact line of code that caused problems and list all the preceding methods called prior to the current method, they will not contain information about the run-time state of the executing application. Using current approaches, as developer trying to investigate this potential issue and its causes would have to make various guesses about the state of the application at each object and/or method in the stack trace.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
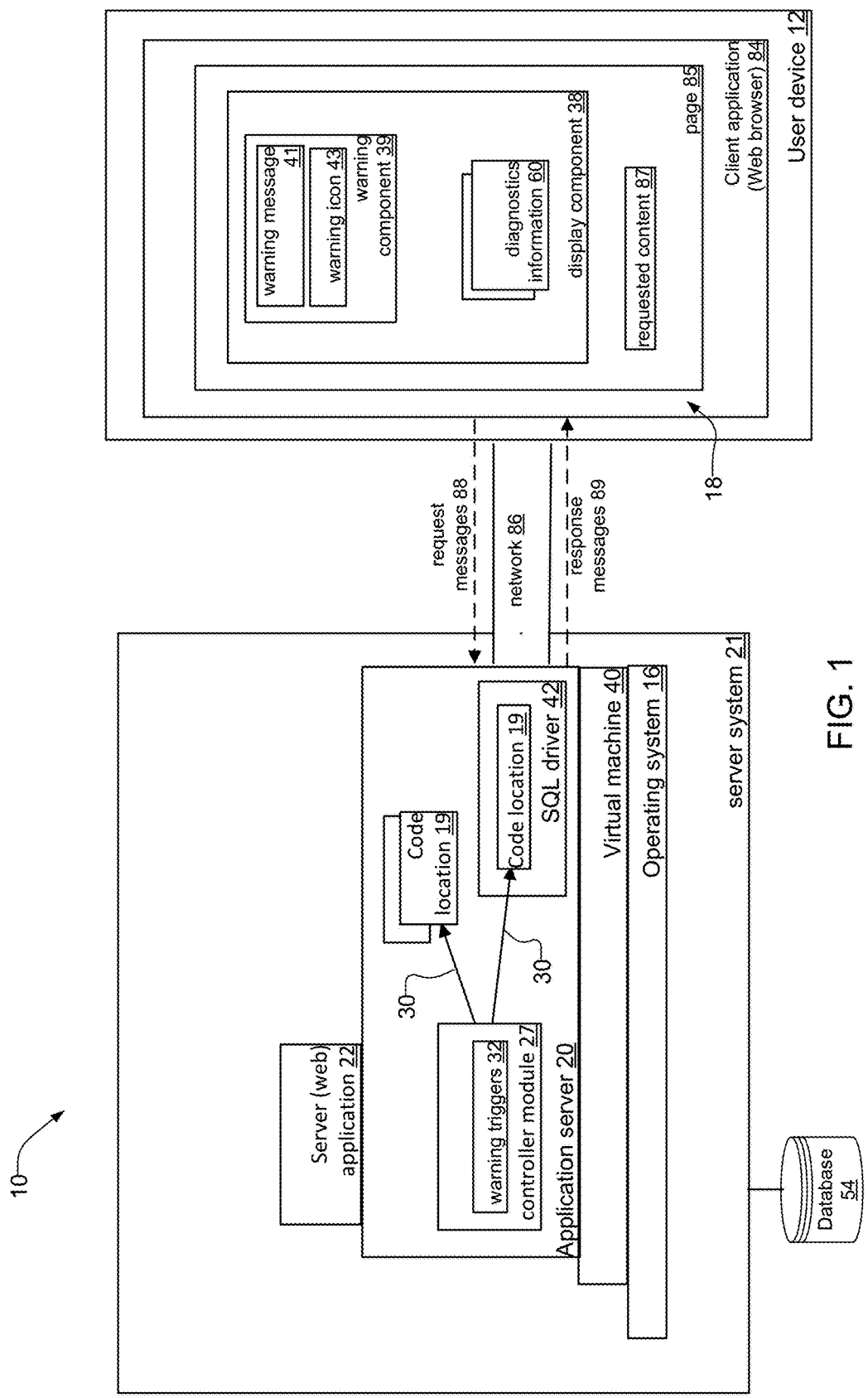
FIG. 1 is a system schematic diagram showing an inventive controller module of a server (web) application executing on an application server, where the controller module injects executable code into the application server that provides diagnostics information for the executing server application, according to an embodiment.

FIG. 1 shows an exemplary application system 10. The system 10 includes a server system 21 that includes at least one application server 20 upon which server applications 22 execute. The application server 20 runs on top of a virtual machine 40, which in turn runs on top of an operating system 16 of the server system 21. The application server 20 also includes a controller module 27, which is typically implemented as an agent, such as a Java agent for a Java application server 20. The controller module 27 includes warning triggers 32.

A user device 12 includes a user device application 84 such as a web browser. The user device applications 84 request content 87 from the server applications 22. The web browsers 84 display the requested content 87 from the server applications 22 in pages 85. The pages 85 further preferably include display components 38. The display components preferably include diagnostics information 60 and warning components 39. The warning components include warning messages 41 and warning icons 43.

Server applications 22 communicate over a network connection 86 such as the Internet to the user device applications 84 running on the user devices 12. The user device applications 84 send request messages 88 to the application server 20 for requested content 87 such as page content. The application server 20, in turn, sends the requests for the requested content 87 to the server application 22. The server application 22 then sends the requested content 87 to the application server 20, which the application server 20 includes in response messages to the user device application 84. The user device application 84 then renders the requested content 87 within a page 85 such as an HTML page. The requested content 87 is typically displayed within a display context 18 or graphical window, such as a web browser 84 user device application on a user device 12.

In a web-based system 10 embodiment, the server application 22 is a web application, and the user device application is typically a web browser 84. The web browsers 22 send HTTP request messages 88 and the web applications 84 send HTTP response messages 89.

Classes that implement the capabilities of the application server 20 execute within code locations 19 of the application server 20. In the example, the application server 20 also communicates with a database or other data structure 54 using a database query language such as the Structured Query Language (SQL) language, in one example. An SQL driver 42 on the application server 20 converts platform-independent SQL queries into their machine-dependent form to enable communication with the database 54. Classes that implement the capabilities of the SQL driver execute within code locations 19 of the SQL driver 42. During class load-time for the application server 20 and/or the SQL driver 42, the controller module 27 injects executable code 30 into specific places or code locations 19 of the application server 20 and/or SQL driver 42.

Figure 2:
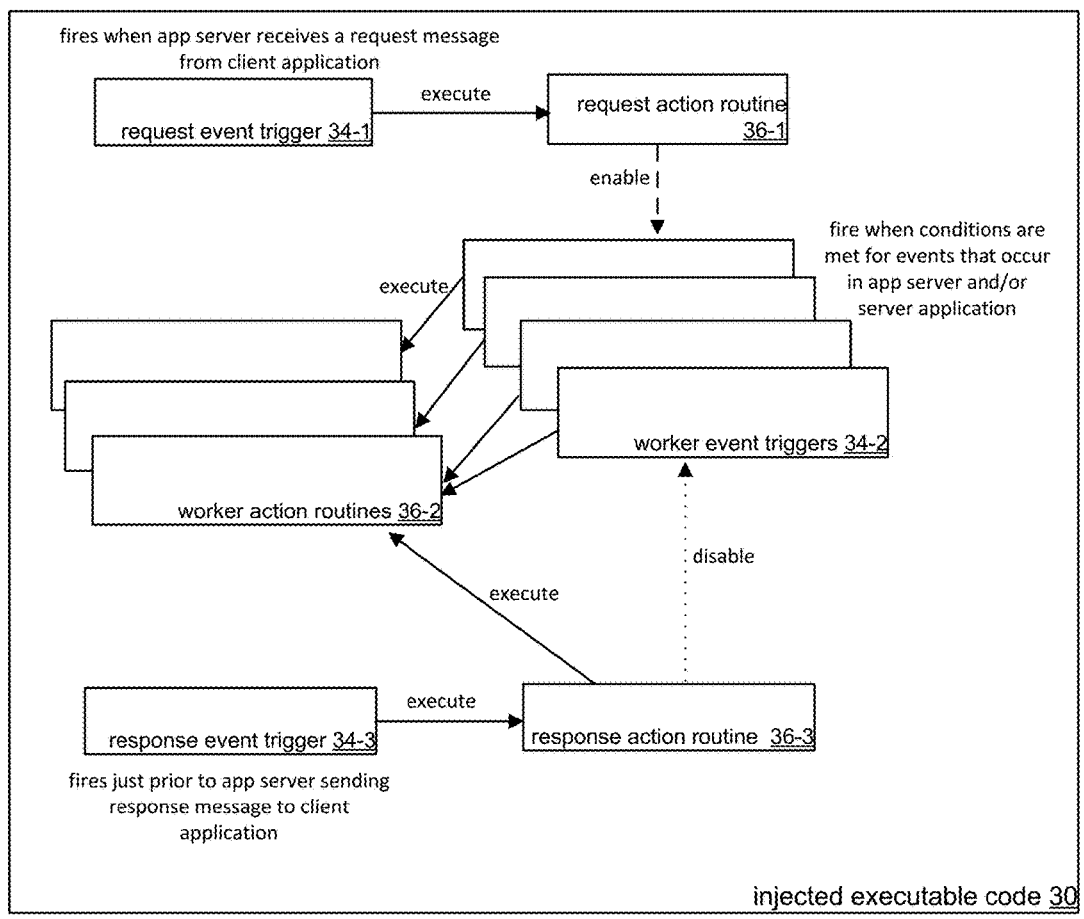
FIG. 2 is a schematic block diagram that shows more detail for the injected executable code of the controller module.

FIG. 2 shows more detail for the injected executable code 30 of the controller module 27.

The injected executable code 30 includes executable code statements for event triggers 34 and action routines 36.

Event triggers 34 include code statements associated with events that occur in the application server 20 or within an executing server application 22. Such events include but are not limited to the execution of specific programming executables, namely bytecode associated with the program code of method bodies within the Java programming language or the .NET programming model. In one example, a user can define the conditions under which the event triggers will execute or fire.

The event triggers 34 and the warning triggers 32 "fire," or execute in response to the occurrence of events in the executing server application 22 that meet defined conditions of the triggers 32/34. The event triggers 34 are associated with action routines 36. Preferably, the event triggers 34 execute their associated action routines 36 in response to events that occur in the server application 22 that meet defined conditions of the event triggers 34. The action routines 36 include executable code statements that, when executed, perform specific tasks or actions, such as collecting diagnostics information 60, producing display components 38, and including the diagnostics information 60 within the display components 38, in examples.

Of the event triggers 34, a request event trigger 34-1 is executed whenever the application server 20 receives a request message 88 from the user device application 84. The request event trigger 34-1 executes an associated request action routine 36-1. The request action routine 36-1 typically enables worker event triggers 34-2.

Worker event triggers 34-2 execute worker action routines 36-2. It is the worker action routines 36-2 that produce display components 38 and warning components 39. The worker action routines 36-2, when fired, collect diagnostics information 60, and include diagnostics information 60 and warning components 39 within the display components 38. Typically, there is a one-to-many relationship between worker event triggers 34-2 and the worker action routines 36-2.

A response event trigger 34-3 is executed just prior to the application server 20 sending each response message 89 to the user device application 84. The response event trigger 34-1 executes an associated response action routine 36-1. The response action routine 36-1 disables the worker event triggers 34-2. The response action routine 36-1 can also execute other worker actions routines 36-2.

In one example, some worker action routines 36-2 collect diagnostics information 60, while others produce display components 38, such as GUI windows and toolbars.

In the preferred example of web applications 22, this "injection" of display components 38 including diagnostics information 60 is made possible by the controller module 27 first intercepting the serving of HTTP request messages 88 received by the application server 20. In response to the application server 22 receiving an HTTP request message 88 from a web browser 84 for requested content 87 of the server application 22, the request event trigger 34-1 fires. Then, the request event trigger 34-1 executes code statements that enable the set of injected worker event triggers 34-2.

The worker event triggers 34-2 then fire in response to events that occur in the app server 20 and/or the web application 22. The worker event triggers 34-2 then execute worker action routines 36-2. Each worker action routine 36-2, when executed, will collect specific diagnostics information 60 such as session data memory snapshots 82, method calls that query a database 54, or local variable information for methods and member values of executing objects, in examples.

Finally, just prior to the application server 20 sending the HTTP response message 89 to the web browser 84, a response event trigger 34-3 fires. The response event trigger 34-3 executes its associated response action routine 36-3. Preferably, the response action routine 36-3 then retrieves the set of collected diagnostics information 60 from the set of worker action routines 36-2, and includes the diagnostics information 60 within display components 38. The response action routine 36-3 then includes the requested content 87, with the display components 38 including the diagnostics information, within the HTTP response message 89 that the application server 20 sends to the web browser 84. The HTTP response message 89 includes HTML code/markup necessary for rendering the display component 38 including the diagnostics information 60 on a web page 85 of the web browser 84.

This solution achieves independence of the particular web application framework or technology. It is able to work in conjunction with any executing server application 22 sending HTML or other formatted responses to a user's web browser 84, in one example. The third party application server 20 itself need not be aware of the injected component 30.

In another embodiment, the user device applications 84 are native applications on the user device 12 and the server applications 22 are non-web applications. An example of a native application is a standalone desktop application on a user device 12. In this example, the application server 20 handles non-HTTP request messages 88 and response messages 89. In one of these examples, the server application 22 is an SMTP mail server, and the user device application 84 is an SMTP mail client.

Figure 3:
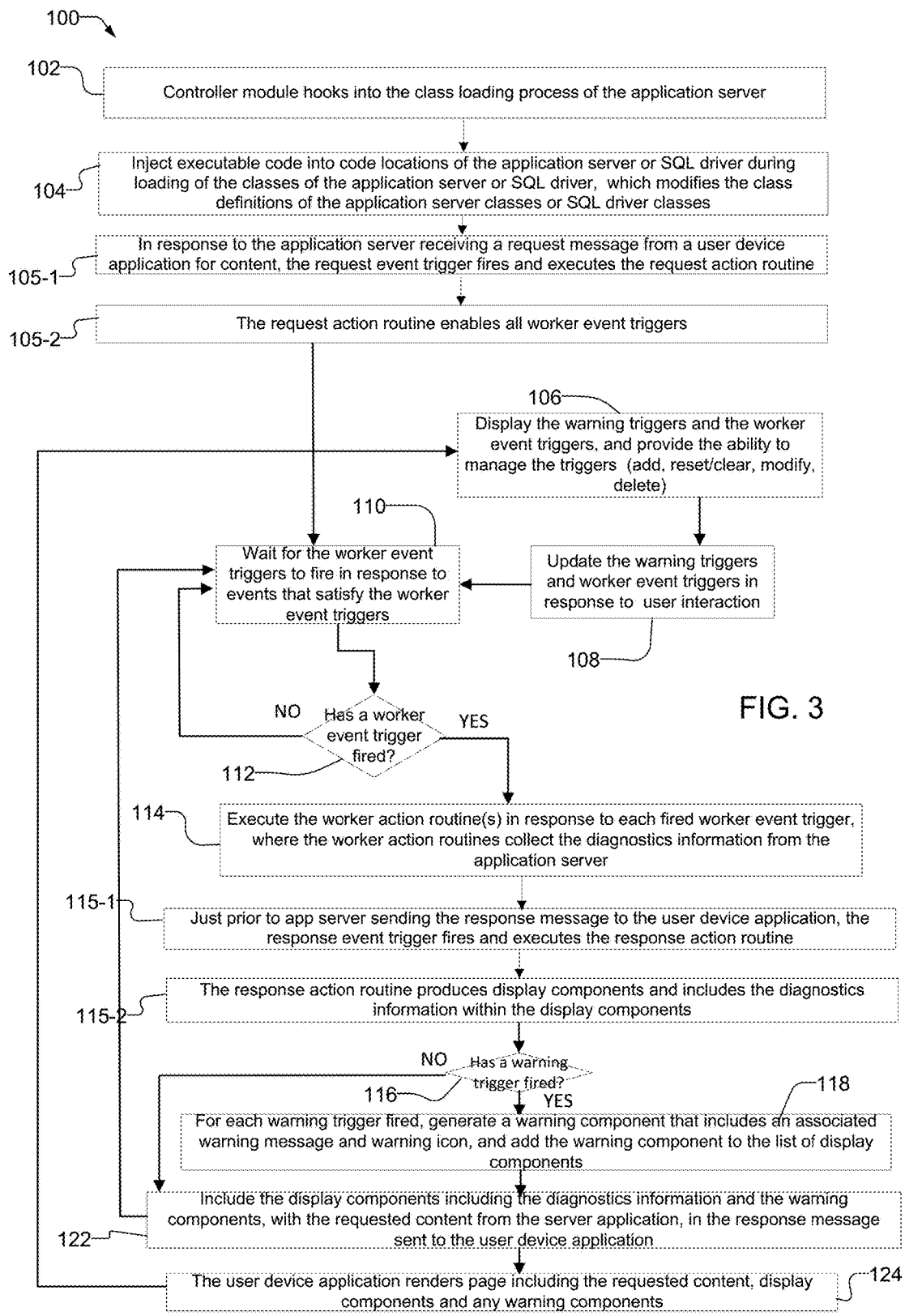
FIG. 3 is a flowchart showing a method of operation for the controller module in FIG. 1.

FIG. 3 is a flow chart of a method 100 for injecting executable code 30 into an executing server application 22. The method 100 describes the injection of executable code 30 including warning triggers 32, event triggers 34, and action routines 36.

In step 102, the controller module 27 hooks into/intercepts the class loading process of the application server 20. In step 104, the controller module 27 injects executable code 30 into code locations 19 of the application server 20 and/or SQL driver 42 during loading of the classes of the application server 20 and/or the SQL driver 42. The injected executable code 30 modifies the class definitions of the existing classes of the application server 20 and/or SQL driver 42, in examples.

According to step 105-1, in response to the application server 20 receiving a request message 88 from a user device application 84 for content 87, also known as requested content, the request event trigger 34-1 fires and executes the request action routine 36-1. According to step 105-2, the request action routine 36-1 enables all associated worker event triggers 34-2.

In step 110, the method waits for the worker event triggers 34-2 to fire in response to events that satisfy the worker event triggers 34-2. It is determined if a worker event trigger 34-2 has fired in step 112. If this statement is true, the method transitions to step 114 to execute the worker action routines(s) 36-2 in response to each fired worker event trigger 34-2. The worker action routines 36 collect the diagnostics information 60 from the application server 20. Otherwise, the method transitions back to step 110 to wait for worker event triggers 34-2 to fire.

In step 114, the method executes the worker action routine(s) 36-2 in response to each fired worker event trigger 34-2, where the worker action routines 36-2 collect the diagnostics information 60 from the application server 20.

In step 115-1, just prior to app server 20 sending the response message 89 to the user device application 84, the response event trigger 34-3 fires and executes the response action routine 36-3. In step 115-2, the response action routine 36-3 produces display components 38 and includes the diagnostics information 60 within the display components 38.

Then, the method transitions to step 116 to determine if a warning trigger 32 has fired. If this statement is true, the method transitions to step 118. In step 118, for each warning trigger 32 fired, the method generates a warning component 39 that includes an associated warning message 41 and warning icon 43, and add the warning component 39 to the list of display components 38. Otherwise, the method transitions to step 122.

In step 122, the method includes the display components 38 including the diagnostics information 60 and the warning components 39, with the requested content 87 from the server application 22, in the response message 89 sent to the user device application 84. Then, in step 124, the user device application 84 renders pages 85 including the requested content 87, display components 38 and any warning components 39. The method then transitions to step 106.

In step 106, the method displays the warning triggers 32 and the worker event triggers 34-2 and provides the ability to and manage the triggers 32, 34 (add/reset/clear, modify, delete).

Then, in step 108, the method updates the warning triggers 32 and the worker event triggers 34-2 in response to user interaction. Step 108 then transitions to step 110 to wait for more worker event triggers 34-2 to fire.

Figure 4:
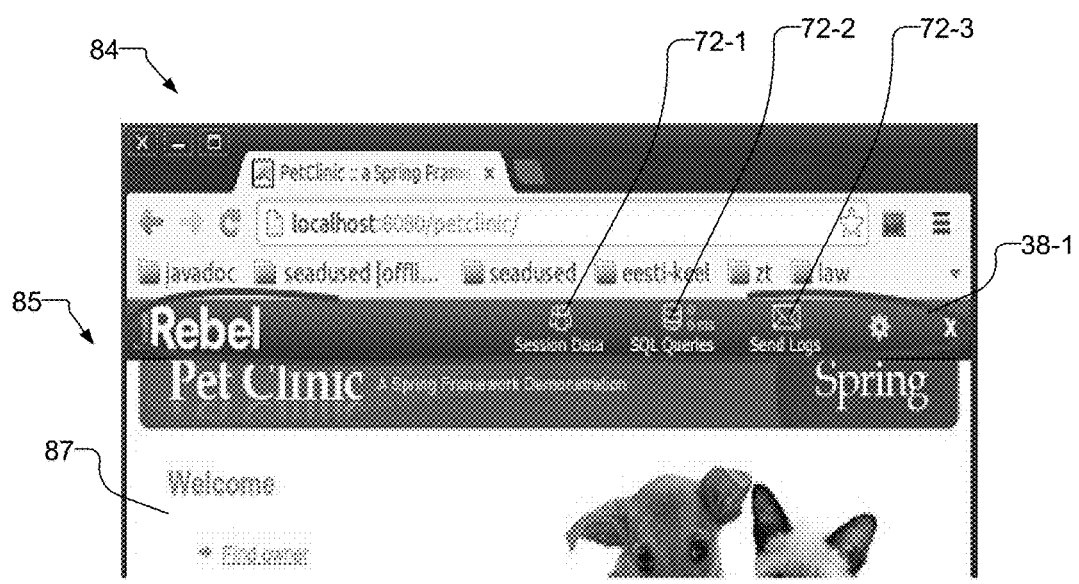
FIG. 4 shows an exemplary GUI toolbar display component that is rendered within an web page of a web browser user device application according to the method of FIG. 3, where selection of a "Session Data" button within the toolbar causes the display of the memory snapshot diagnostics information displayed in FIG. 7, and where selection of an "SQL Queries" button within the toolbar causes the display of the SQL query-enhanced call stack trace diagnostics information displayed in FIG. 8.

FIG. 4 shows an exemplary injected GUI toolbar display component 38-1. The toolbar 38-1 is included within the same display context 18 as the requested content 87 of the running server application 22 in this example. Specifically, the toolbar 38-1 is injected into the same web page 85 that includes the requested content 87 of the server application 22.

The toolbar 38-1 includes additional active display components 38, such as buttons 72, for example. In the example, the common display context 18 is an HTML page 85 within a web browser 84.

Typically, selection of the buttons 72 causes the execution or "launching" of other display components 38, such as GUI window display components 38, which in turn include the diagnostics information 60.

Figure 7:
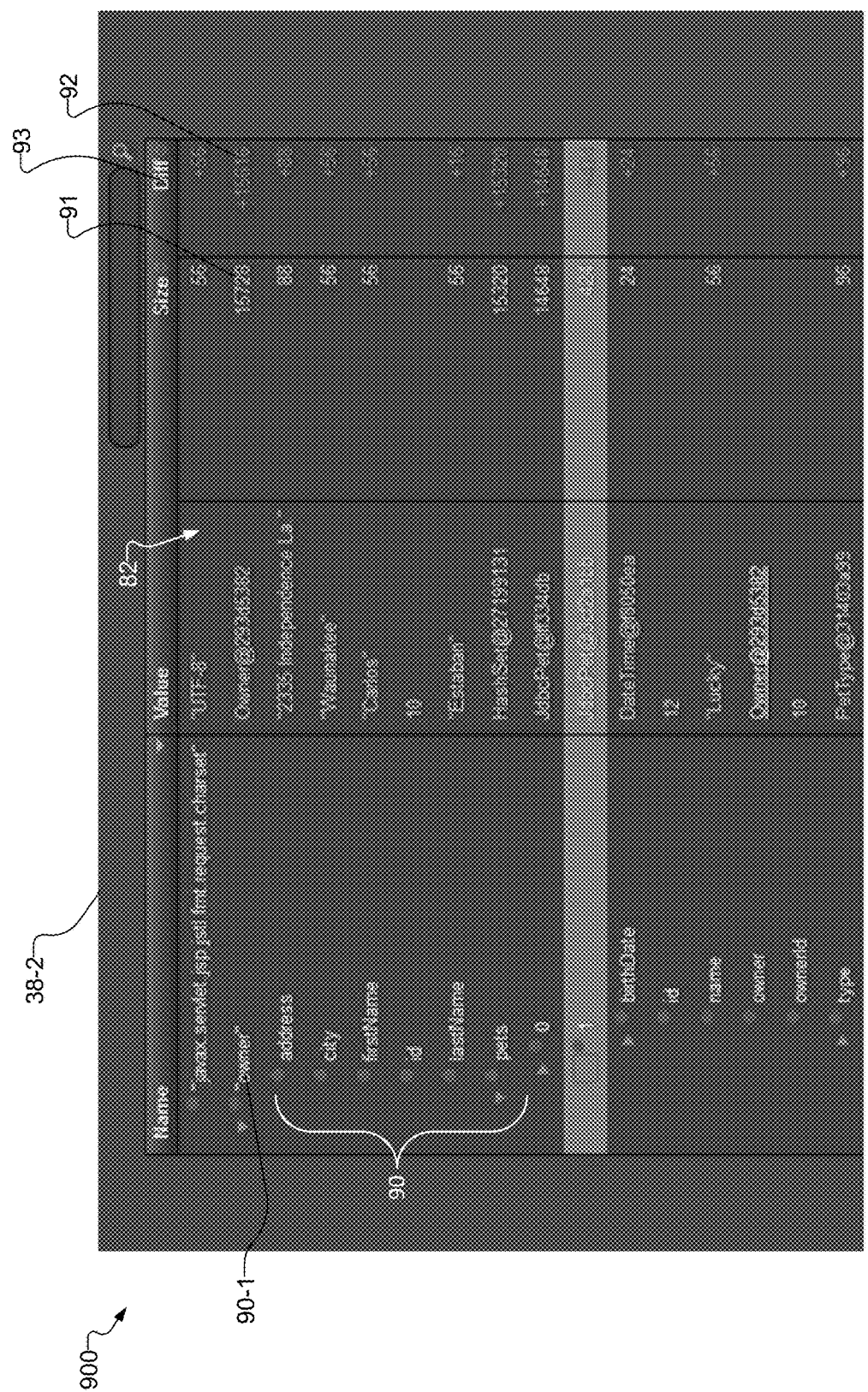
FIG. 7 shows a user interface of the memory profiler tool associated with the method of FIG. 5 as displayed by a computer, such as a user device.

In one example, button 72-1, labeled "Session Data," launches the memory profiler tool 900 of FIG. 7. In another example, button 72-2, labeled "SQL Queries," launches the enhanced Java call hierarchy tool 902 of FIG. 8. In yet another example, button 72-3, labeled "Send Logs," launches injected executable code 30 for displaying warnings/log information, such as that generated in response to firing of warning triggers 32.

Figure 5:
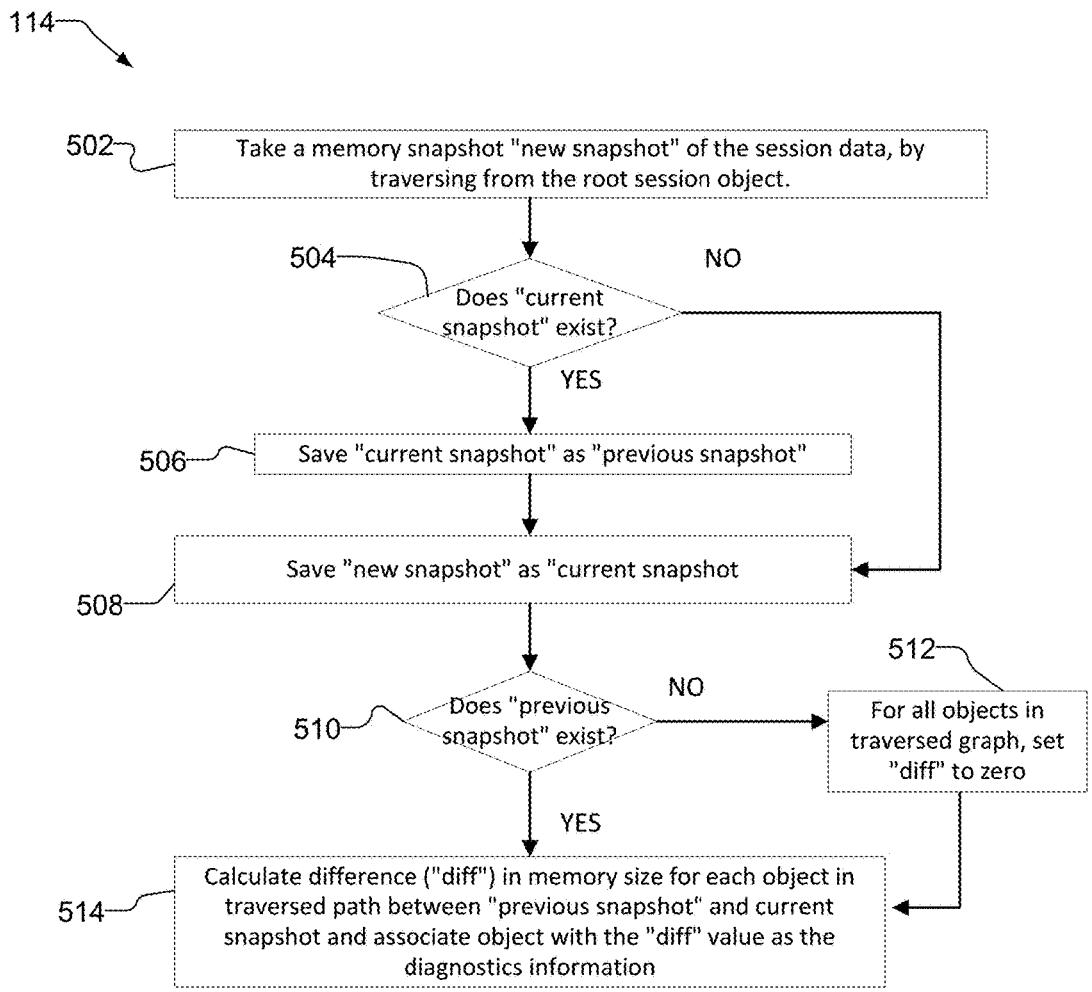
FIG. 5 is a flowchart that shows a method for a worker action routine injected executable code component that provides a memory profiling tool display component, which includes memory snapshot diagnostics information.

FIG. 5 is a flowchart that shows a method for a worker action routine injected executable code component 36-2. The worker action routine 36-2 produces a memory profiling tool display component 38-2, and includes memory snapshot 82 diagnostics information 60 within the display component 38-2. FIG. 5 provides a specific example for implementing step 114 of FIG. 3.

Server applications such as web applications 22 often hold a significant amount of per-user data in the memory of the application server 20, known as session data. As the application server 20 might be serving hundreds of users in parallel, the size of each user's session data will become rather important. This is because the size of a user's session is multiplied by the number of concurrent users to obtain the total memory consumption due to all user sessions. This motivates a developer to manage what objects are kept in the session and how much memory they consume. By utilizing aspects of the invention a developer is constantly updated with relevant diagnostics and possible defects in the session data for one particular user, himself.

The method of FIG. 5 compares the session data for a particular client of a server application 22 in multiple moments of time (two or more). The method captures two or more memory snapshots 82 of the session data, compares the snapshots 82, post-processes the compared snapshot data, and produces a resulting tree.

For capturing of memory snapshots 82, snapshots of the object graph of a user's session data are taken automatically at some specific moment of time. One suggested point-of-time to capture a memory snapshot 82 is in the end of each HTTP request that this specific client makes; other triggers might also be used. Taking a memory snapshot 82 is a simple process of walking the in-memory object graph and remembering the objects.

For post-processing of the data, the object graphs are converted into trees, keeping only the shortest path to each object. Turning the graph into a tree is similar to Eclipse MAT's concept of dominator trees. Then, the method compares the trees, providing an overview of the dynamics of memory consumption to the developer. The method further includes choosing a pair of those snapshots and displaying the "sum" of those trees (showing all the nodes present in at least one of those trees and joining together nodes present in both trees) and the difference in memory consumption for each node.

Comparing the trees involves additional details. For example, comparing two snapshots of a collection involves remembering the identities of the member objects of the collection. If in the newer snapshot, the set of members is the same but their order has been shuffled, this is not counted for as a change in memory consumption of the collection.

The worker action routine 36-2 traverse along the root session object (i.e. instance of HTTPSession class for a web application 22) of session data of application server 20 and collect diagnostics information 60 that includes creating memory snapshots 82 of the session data and calculating diffs of the memory snapshots 82.

In step 502, the method takes a memory snapshot "new snapshot" 82 of the session data, by traversing from the root session object.

Figure 6A:
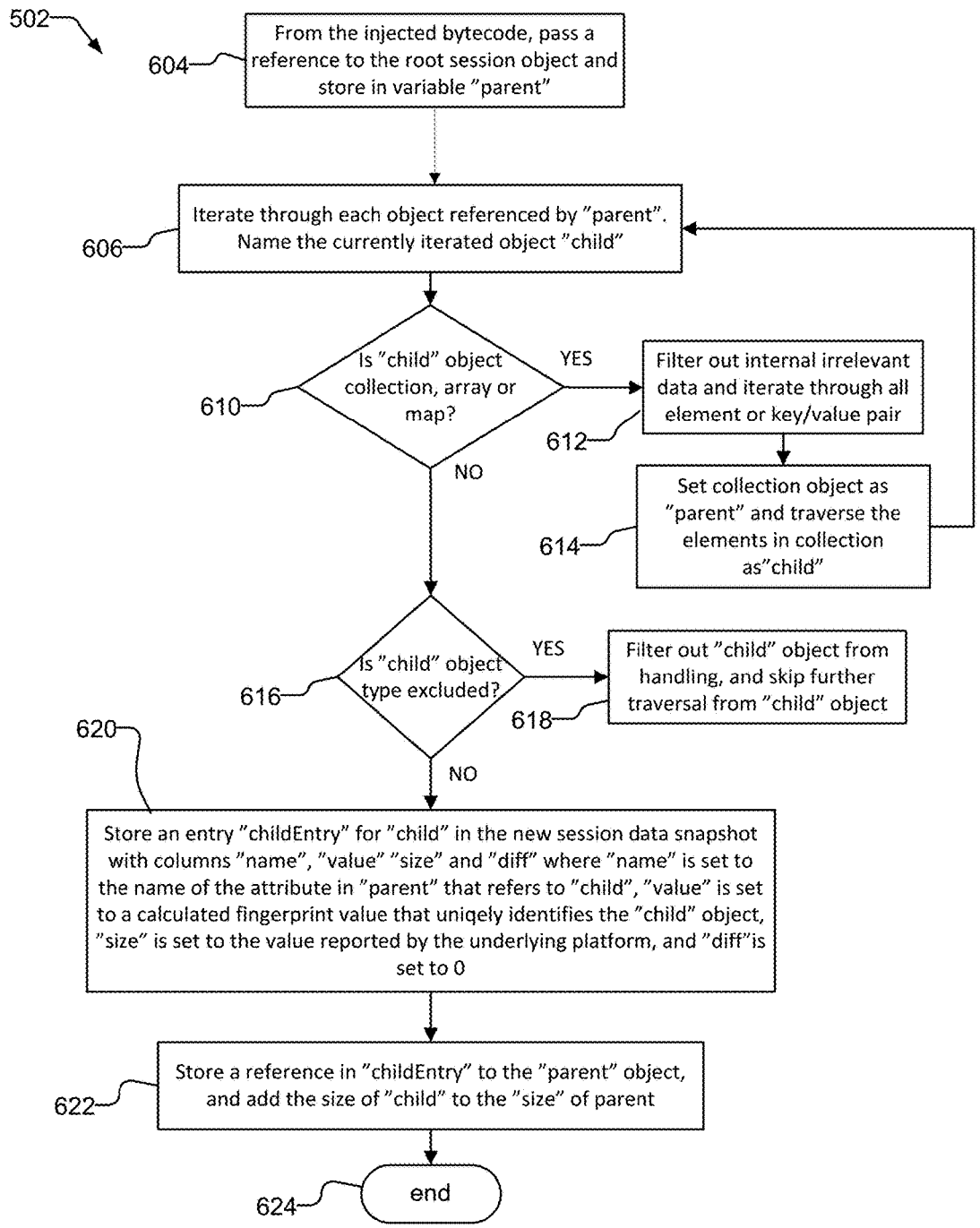
FIG. 6A-6B are flow charts that show more detail for the flow chart of FIG. 5.

FIG. 6A provides more detail for method step 502 of FIG. 5.

In step 604, from the injected bytecode, a reference to the root session object is passed and stored in variable "parent." In step 606, the method iterates through each object referenced by "parent", and names the currently iterated object "child".

According to step 610, the method then determines if the data structure associated with the "child" object is any of type collection, array, or map, in examples. If this statement is true, the method transitions to step 612 to filter internal data irrelevant to the scope of the session data, and iterates through all element or key/value pairs. Otherwise, the method transitions to step 616.

Upon completion of step 612, the method transitions to step 614 to set collection object as "parent" and traverse the elements in collection as "child." The method then transitions back to step 606 to continue iterating through each object referenced by "parent".

In step 616, the method then determines if the "child" object type is excluded. If this statement is true, the method filters out the "child" object from handling, and skips further traversal from "child" object in step 618. Otherwise, the method transitions to step 620.

In step 620, the method stores an entry "childEntry" for "child" in the new session data snapshot 82 with columns "name", "value" "size" and "diff." In the entry, "name" is set to the name of the attribute in "parent" that refers to "child", "value" is set to a calculated fingerprint value that uniquely identifies the "child" object, "size" is set to the value reported by the underlying platform, and "diff" is set to 0. Then, in step 622, the method stores a reference in "childEntry" to the "parent" object, and adds the size of "child" to the "size" of parent. The method completes in step 624.

Returning to FIG. 5, the method transitions to step 504 to determine if a "current" snapshot exists. If this statement is true, the method transitions to step 506 to save "current snapshot" as "previous snapshot." Otherwise, the method transitions to step 508 to save "new snapshot" as "current snapshot."

The method transitions to step 510 to determine if a "previous" snapshot exists. If this statement is true, the method transitions to step 514 to calculate the difference ("diff") in memory size for each object in traversed path between "previous snapshot" and current snapshot and associate object with the "diff" value. Otherwise, in step 510, the method transitions to step 512 to set "diff" to zero for all objects in the traversed graph.

Figure 6B:
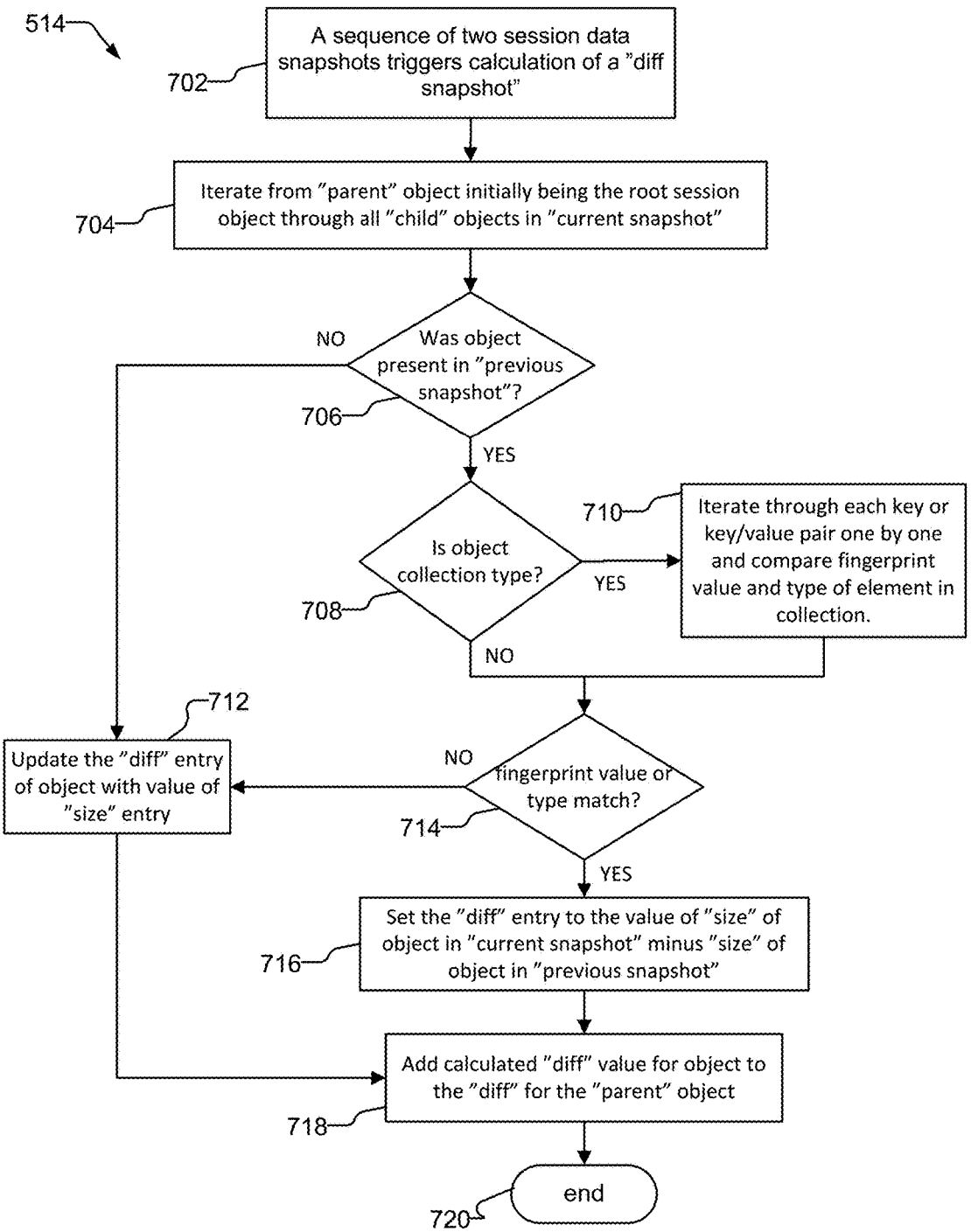

FIG. 6B provides more detail for step 514 of FIG. 5.

In step 702, a sequence of two session data snapshots 82 triggers calculation of a "diff snapshot." In step 704, the method iterates from "parent" object initially being the root session object through all "child" objects in "current snapshot." Then, in step 706, the method determines if the object was present in "previous snapshot." If this statement is true, the method transitions to step 708. Otherwise, the method transitions to step 712 to update the "diff" entry of object with value of the "size" entry.

According to step 708, the method determines if the object is a collection data structure type. If this statement is true, the method transitions to step 710 to iterate through each key or key/value pair one by one and compare fingerprint value and type of element in collection. Otherwise, the method transitions to step 714.

In step 714, the method determines if there is a fingerprint value or type match. If this statement is true, the method transitions to step 716 to set the "diff" entry to the value of "size" of object in "current snapshot" minus "size" of object in "previous snapshot." Otherwise, the method transitions to step 712.

Upon completion of step 716, the method transitions to step 718 to add a calculated "diff" value for object to the "diff" for the "parent" object. The method completes in step 720.

FIG. 7 shows a memory profiler tool 900. It is displayed within a display component 38-2 in one example. The memory profiler tool 900 is associated with the method of FIG. 5, and is launched in response to selection of the "Session Data" button 72-1 in FIG. 4.

The display component 38-2 provides a comparison view of two memory snapshots 82 of a web application 22 converted into a tree representation as the diagnostics information 60. The memory snapshots 82 include memory object data 90 for objects within each snapshot 82.

In the example, the Owner object, labeled with reference 90-1, existed in the first snapshot 82 but was very small (112 bytes). In the comparison view, the size of the Owner object 90-1 increased ~140 times within the second snapshot 82 to 15728 bytes, indicated by reference 91. The difference in size for the Owner object 90 between the two snapshots, indicated by reference 92, is 15616 bytes.

Typically, memory stack traces can be very large, difficult to read, and provide no overview of the dynamics such as the growth of session size over time.

In the illustrated embodiment, the object data 90 is filtered to remove information outside the scope of the session data. This allows developers to more easily sort through the memory object data 82. Moreover, the enhanced "diff" information, indicated by reference 93, includes difference values calculated for all parent objects, child objects, and attributes. In contrast, current memory snapshot tools provide an aggregate object memory size of the main object and all of its child objects, and not a per-object and per-sub object capability.

Figure 8:
FIG. 8 shows a user interface of a Java call hierarchy tool display component as displayed by a computer, such as a user device, where the Java call hierarchy tool includes database query language method call diagnostics information, according to the method of FIG. 3.

FIG. 8 shows an enhanced Java call hierarchy tool 902. The Java call hierarchy tool 902 includes a GUI window display component 38-3. The enhanced Java call hierarchy tool 902 is created in response to the method of FIG. 3 step 104, when the controller module 27 injects the executable code 30 into code locations 19 of an SQL driver 42. The Java call hierarchy tool 902 is also launched in response to selection of the "SQL Queries" button 72-2 in FIG. 4.

The hierarchy tool 902 provides a Java call hierarchy that has been enhanced according to the flow chart of FIG. 3 to show which Java methods also make SQL queries. Groups of queries 94 are displayed together to enable improved display and detection of member SQL queries within the group 94.

An example of a threshold value/warning trigger 32 associated with SQL queries is if there exists two places in code (the method that contains the SQL query) that execute either the same query or a query that lies within the same group.

An example of SQL grouping follows. In the example, one method could make queries such as "get the bills for customer number 4," "get the bills for customer number 6," and "get the bills for customer number 9." These queries have the same structure and differ only by the customer ID. Using the method of FIG. 6, such queries are grouped together under an abstract representation of the query like "give me bills for customer number X". These structurally identical queries are important to detect (commonly known as the "n+1 problem"), as they are typically the easiest spots where developers could and should optimize their code.

Figure 9:
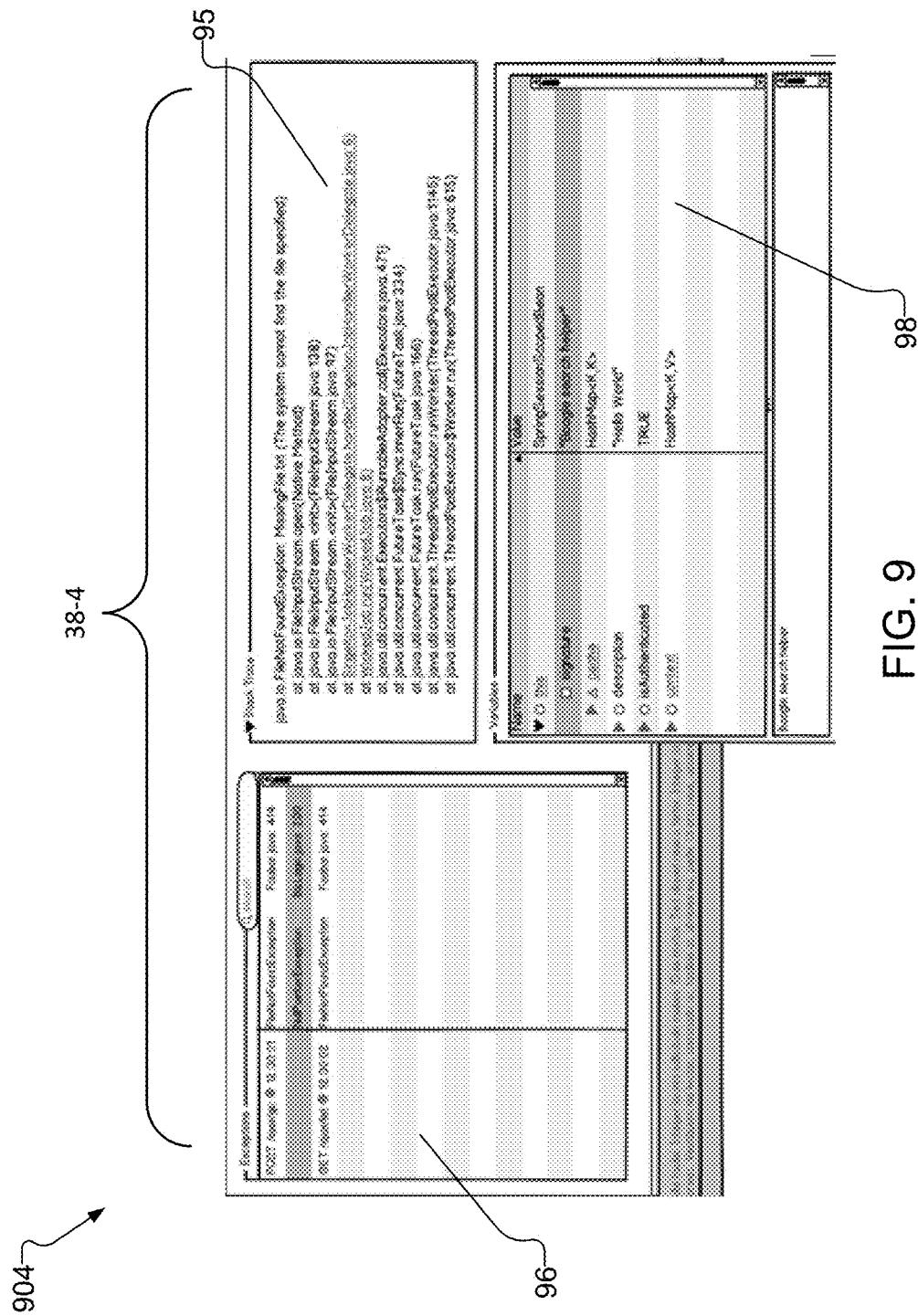
FIG. 9 shows a user interface of a Java call stack tool display component displayed by a computer such as a user device, where the Java call stack tool includes object size and sub-object size diagnostics information according to the method of FIG. 3.

FIG. 9 shows an enhanced Java call stack trace tool 904. The Java call stack trace tool 904 includes a GUI window display component 38-4. The enhanced Java call stack trace tool 904 is created in response to the method of FIG. 3 step 104, when the controller module 27 injects the executable code 30 into code locations 19 of the application server 20.

The GUI window display component 38-4 includes an enhanced java call stack hierarchy as the diagnostics information. The call stack trace 904 provides a Java call hierarchy that has been enhanced to provide state information for each frame in a standard Java call stack trace. In one example, the developer can navigate through the frames in the traditional stack frame of pane 95 and their associated exceptions in pane 96. In addition, however, pane 98 can provide state information for local variables and method arguments, in examples.

In stack trace analysis, when program execution hits a point where something goes wrong or an unexpected situation is reached, a common way to proceed is by throwing an "exception." Exceptions are typically written into execution log files and receive special attention and analysis from developers and software maintainers.

In the Java platform, the common information a developer will get about an exception is the exception's stack trace. Stack trace is a chain (an ordered list) of methods, where every next method was called by a previous method and where the last called method is the method where the erroneous state took place (leading to an exception being thrown). This gives a developer some insight about what the software was attempting to do when the potential problem arose.

While the stock Java stack trace view will identify the exact line of code that caused the problem and all the preceding called methods, it will not contain information about the state of the application. A developer trying to investigate potential issues and their causes would have to make various guesses about the state of the applications at the time the exceptions occur. Determining the state of an object at the time of an exception is difficult and typically requires detailed knowledge of what external stimuli and other operating conditions existed at the time of the exception.

In contrast, the enhanced Java call stack trace tool 904 enhances the standard Java stack trace with information about the data that the methods in the stack trace were processing before the exception occurred. The actions provided by the method include recording the application execution, and showing the enhanced stack trace with the stored/recorded information.

As the program execution reaches a point where an exception is thrown, the recorded information is used to generate the enhanced stack trace. The display component 38-4 allows the user to navigate within the stack trace and examine the details of each stack frame open at the moment of each exception being thrown.

In contrast, the standard Java debugger has a significant limitation. The limitation is that the exception needs to be reproduced after it has already happened. This has historically presented problems for developers and test personnel, especially when an exception happens rarely or is difficult to reproduce. The requirement of current debuggers to reproduce such failures wastes significant time and money.

Moreover, if a developer did not use best practices such as providing a guard against all possible failures during a debugging session (e.g. by setting an exception breakpoint for the Java Throwable exception), the opportunity to understand and discover the underlying problem of an exception has passed.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for providing diagnostics information of a server application executing on an application server, the method comprising:
    injecting executable code including event triggers and action routines into the application server during loading of classes of the application server;
    the application server receiving request messages for content from an application on a user device;
    the event triggers executing the action routines in response to events that meet defined conditions of the event triggers, the event triggers including a request event trigger, one or more worker event triggers, and a response event trigger;
    the action routines collecting the diagnostics information;
    the action routines including the diagnostics information with the requested content within response messages sent by the application server to the user device application, and the action routines including a request action routine, one or more worker action routines, and a response action routine;
    the request event trigger executing the request action routine in response to the application server receiving the request messages from the user device application, and the request action routine enabling the worker event triggers;
    the worker event triggers executing the worker action routines in response to events that meet defined conditions of the worker event triggers, and the worker action routines collecting the diagnostics information;
    the response event trigger executing the response action routine in response to the application server preparing to send the response messages to the user device application; and
    presenting the requested content together with toolbar display components within a same graphical window on the user device, user selection of the tool bar display components causing display of the diagnostics information.

2. The method of claim 1, further comprising the action routines producing the toolbar display components, and including the diagnostics information, the toolbar display components, and the requested content within the response messages sent by the application server to the user device application.

3. The method of claim 1, wherein the application on the user device is a web browser.

4. The method of claim 1, wherein the application on the user device is a native application.

5. The method of claim 1, further comprising the application server including warning triggers that generate warning components in response to events that occur in the executing server application or that meet defined conditions of the warning triggers, the warning components including an associated warning message and/or icon, wherein the warning components are presented with the requested content and the toolbar display components.

6. The method of claim 5, further comprising the action routines including the warning components, the toolbar display components, the diagnostics information, and the requested content within the response messages sent by the application server to the application on the user device.

7. The method of claim 1, wherein injecting executable code including event triggers and action routines into the application server during loading of classes of the application server comprises injecting Java bytecode into the classes of the application server as the executable code.

8. The method of claim 1, wherein the response action routine executes some of the worker action routines, where the worker action routines produce the toolbar display components, and include the diagnostics information and the toolbar display components within the response messages sent to the user device application.

9. The method of claim 1, wherein the diagnostics information includes size information for each object, sub object, and/or attribute of each object that is reachable from a session root object based on one or more memory snapshots of session data of the server application.

10. The method of claim 9, wherein the diagnostics information includes calculated differences in memory sizes for the objects, sub objects, and/or attributes between two or more of the memory snapshots.

11. The method as claimed in claim 10, further comprising displaying the diagnostics information by providing a comparison view of two memory snapshots.

12. The method as claimed in claim 11, wherein a size column of the comparison view of the two memory snapshots indicates sizes of each object, sub object and/or attribute for a current memory snapshot, and a differential column of the comparison view indicates calculated differences in memory sizes for each object, sub object and/or attribute between the current memory snapshot and a previous memory snapshot.

13. The method as claimed in claim 11, wherein the comparison view of the two memory snapshots includes a tree representation of the objects, sub objects and/or attributes within the two memory snapshots.

14. The method as claimed in claim 9, further comprising filtering from the memory snapshots all object information in a heap space outside a memory space of the session data.

15. The method of claim 1, wherein the diagnostics information indicates which methods of an executing Java application make database query language queries.

16. The method as claimed in claim 15, further comprising displaying the diagnostics information by providing a Java call hierarchy showing the methods making database query language queries, wherein structurally identical queries are displayed together.

17. The method of claim 1, wherein the action routines enhance a call stack trace of an executing Java application as the diagnostics information, by including state information for each object and sub object in the call stack trace.

18. The method of claim 1, further comprising injecting the toolbar display components into a same web page that includes the requested content.

19. The method of claim 1, further comprising executing GUI window display components that include the diagnostics information.

20. The method of claim 1, further comprising including the requested content below the tool bar display component.

21. A system for providing diagnostics information of an executing server application, the system comprising:
user devices including applications running on the user devices, the user device applications requesting content from the server application by sending request messages for the requested content over a network connection and
an application server, including a memory storing the server application, on which the server application executes, the application server receiving the request messages for the requested content from the user device applications and sending the request messages to the server application, the application server including a controller module, wherein the controller module injects executable code into the application server during loading of classes of the application server, and wherein the injected executable code includes event triggers and action routines, and wherein the event triggers execute the action routines in response to events that meet defined conditions of the event triggers, and wherein the action routines collect the diagnostics information, and wherein the action routines include the diagnostics information with the requested content within response messages sent by the application server to the user device application, wherein the diagnostics information indicates which methods of an executing Java application make database query language queries;
wherein the user devices present the requested content together with tool bar display components within a same graphical window on the user devices, user selection of the tool bar display components causing display of the diagnostics information.

22. The system of claim 21, wherein the injected executable code includes warning triggers, and wherein the warning triggers generate warning components in response to events that occur in the executing server application that meet defined conditions of the warning triggers, the warning components including an associated warning message and/or icon, wherein the warning components are presented with the requested content and the toolbar display components.

23. The system of claim 21, wherein the injected executable code includes code statements that produce Graphical User Interface (GUI) window display components, and wherein the GUI window display components include the diagnostics information.

24. The system of claim 21, wherein the injected executable code includes code statements that produce GUI window display components and the toolbar display components, and wherein the toolbar display components include buttons, and wherein the toolbar display components execute the GUI window display components in response to selection of the buttons, the GUI window display components including the diagnostics information.

25. The system of claim 21, wherein the diagnostics information includes size information for each object, sub object, and/or attribute of each object that is reachable from a session root object based on one or more memory snapshots of session data of the executing server application.

26. The system of claim 21, wherein the diagnostics information includes an enhanced call stack trace of an executing Java application, and wherein the enhanced call stack trace includes state information for each object and sub object in the enhanced call stack trace.

27. The system of claim 21, wherein the requested content is included below the toolbar display component.

28. The system of claim 21, wherein the injected executable code includes code statements that produce GUI window display components and the toolbar display components, and wherein the toolbar display components include buttons, and wherein the toolbar display components execute the GUI window display components in response to selection of the buttons, the GUI window display components including the diagnostics information.

29. A method for providing diagnostics information of a server application executing on an application server, the method comprising:
injecting executable code including event triggers and action routines into the application server during loading of classes of the application server;
the application server receiving request messages for content from an application on a user device;
the event triggers executing the action routines in response to events that meet defined conditions of the event triggers;
the action routines collecting the diagnostics information;
the action routines including the diagnostics information with the requested content within response messages sent by the application server to the user device application;
presenting the requested content together with toolbar display components within a same graphical window on the user device, user selection of the tool bar display components causing display of the diagnostics information;
the application server including warning triggers that generate warning components in response to events that occur in the executing server application or that meet defined conditions of the warning triggers, the warning components including an associated warning message and/or icon, wherein the warning components are presented with the requested content and the toolbar display components, wherein the defined conditions of the warning triggers include at least one of growth in size of session data of the server application and detecting structurally identical database queries.

* * * * *